Figure 1:
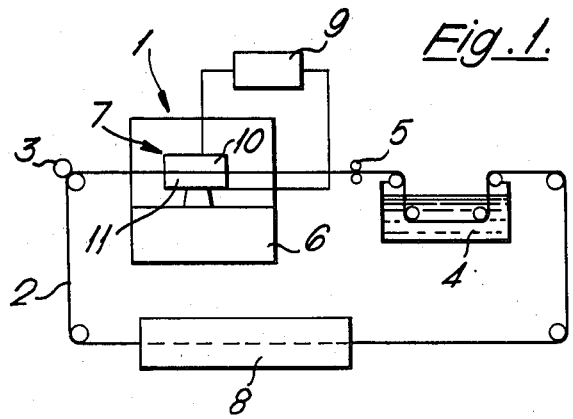

United States Patent [19]

Goddard

[11] 4,391,684
[45] Jul. 5, 1983

[54] METHOD OF MANUFACTURE OF AN ARTICLE HAVING INTERNAL PASSAGES

[75] Inventor: John Goddard, Bristol, England

[73] Assignee: Rolls-Royce Limited, London, England

[21] Appl. No.: 279,782

[22] Filed: Jul. 2, 1981

[30] Foreign Application Priority Data

Jul. 17, 1980 [GB] United Kingdom ................. 8023395

[51] Int. Cl.³ ............................. B23P 1/00; B23P 1/10
[52] U.S. Cl. ............................. 204/129.4; 204/129.43; 204/129.46; 204/209; 204/224 M
[58] Field of Search ........... 204/129.4, 129.46, 129.43, 204/224 M, 224 R, 209

[56] References Cited

U.S. PATENT DOCUMENTS 2,902,584 9/1959 Ullmann ..................... 204/224 M X
3,619,389 11/1971 Eisner ........................ 204/129.46 X

FOREIGN PATENT DOCUMENTS 1162407 9/1958 France .
117101 11/1959 U.S.S.R. .
261118 1/1970 U.S.S.R. .
407474 7/1976 U.S.S.R. ......................... 204/224 M
542610 2/1977 U.S.S.R. ......................... 204/224 M
550265 3/1977 U.S.S.R. .

Primary Examiner—Donald R. Valentine
Attorney, Agent, or Firm—Parkhurst & Oliff

[57] ABSTRACT

A method of manufacture of hollow turbine blades for gas turbine engines comprises forming them in two parts and brazing the parts together. This requires very accurate machining of the two faces of the parts which are to be joined prior to the brazing process. The invention provides a method of machining two conforming faces of parts of an article which are to be joined together. The method includes the step of passing an electrolyte linishing belt (2) FIG. 4 between the confronting surfaces of the two parts (10,11) and in contact with both faces simultaneously while passing an electric current between the parts. Thus one or both faces of the parts are machined using one as the former for the other.

6 Claims, 4 Drawing Figures

U.S. Patent  Jul. 5, 1983  4,391,684

METHOD OF MANUFACTURE OF AN ARTICLE HAVING INTERNAL PASSAGES

DESCRIPTION

The present invention relates to a method of manufacture of an article having one or more internal passages therein and an article made by the method. The invention has particular but not exclusive reference to the manufacture of cooled turbine blades for gas turbine engines.

Due to the need for more complex cooling fluid flow patterns within turbine blades for improved cooling, it is becoming increasingly difficult to cast the blades because of the problems involved in making the appropriate cores and removing them afterwards.

One solution to this problem is to make the blade in two parts and to partially form the cooling fluid passages in surfaces one or both of the parts, either during the casting of the parts, or afterwards, and then to join the two parts together with the surfaces accurately aligned and abutting to define the completed passages.

Problems are being experienced in accurately machining the two surfaces in preparation for the joining operation and in accurately aligning them before joining. This is particularly so where the blades have significant twist along their length.

The present invention solves this problem and is characterised in that the two confronting surfaces on the blade parts are accurately matched by machining one using the other as a former, or by machining both surfaces using each simultaneously as a former for the other, on an electrolytic linishing machine wherein the linishing belt passes between the surfaces, making contact with both surfaces simultaneously, while an electrical machining current passes between the two parts and through an electrolyte carried in the belt pores.

After the linishing process further fine slots may be machined in one or both of the two abutting surfaces before they are finally joined together.

Figure 2:
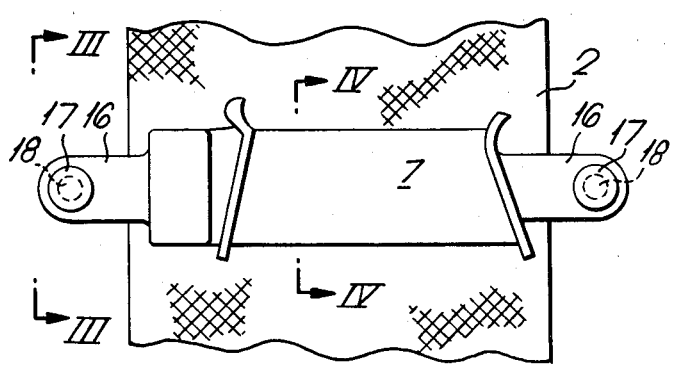
Figure 3:
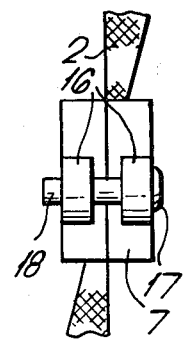
Figure 4:
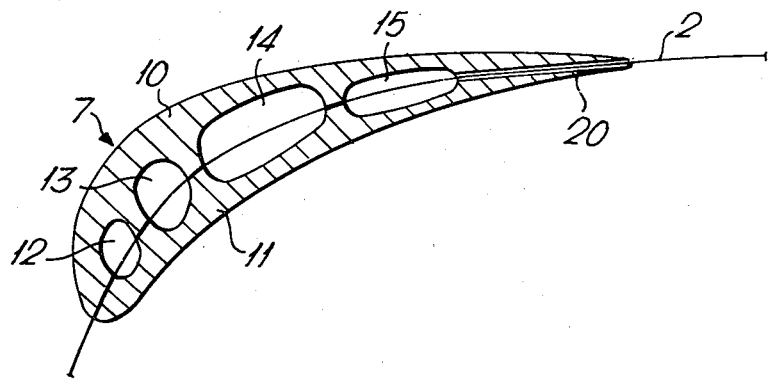

The invention will now be more particularly described, by way of example only, with reference to the accompanying drawings in which:

FIG. 1 is a diagrammatic representation of the machine with a blade in place being machined, FIG. 2 is an enlarged view of the blade and the linishing belt, FIG. 3 is a view on the line III—III of FIG. 2, and FIG. 4 is an enlarged on the line IV—IV of FIG. 2.

Referring now to the drawings there is shown in FIG. 1 an electrolytic linishing machine represented diagrammatically at 1 which is known per se and which includes a linishing belt 2 which is continuous. The belt, which is porous, is driven by rollers 3 through a bath of electrolyte 4 where it picks up the liquid electrolyte in the pores within the material. Excess liquid is squeezed out by a pair of rollers 5 and the belt passes through the work station 6, where it operates on the workpiece 7, and on to a cleaning station 8 where the debris from the machining operation is removed. This process is described in Russian Pat. No. 117,101.

The belt itself is thin and flexible so that it can accommodate the twist in the blade and it is dimensioned to extend across the whole length of the blade.

The blade 7 is made in two parts 10,11 and the linishing belt passes between the two parts in contact with both of the surfaces to be joined. A light clamping pressure is applied across the two parts. An electrical power source 9 is provided which is connected across the two parts which then form the anode and cathode in an electrical circuit which is completed by the electrolyte in the pores of the belt. When an electrical current is passed through the circuit, from the source 9, metal is removed from one or both surfaces of the workpiece contacted by the belt depending on whether or not the current used is a uni-directional d.c. current, a d.c. current which reverses periodically, or an a.c. current. It is to be understood that the power source 9 may provide either a.c. or d.c. current, and in the latter case a switching device may be employed to enable the direction of the d.c. current to be periodically reversed.

As shown in FIGS. 2 to 4 the blade parts 10 and 11 are cast with the main cooling passages 12, 13, 14 and 15 partially formed in each part, and with apertured end lugs 16 provided to accommodate insulating bushes 17 for locating pins 18. The pins 18 are used to locate the two parts relatively during the linishing process, and to ensure accurate re-location of the two parts after they have been separated and removed from the machine for brazing.

It can be seen that by this method of linishing using the surface of one part as a former for the machining of the other, a very accurate match can be achieved in the two surfaces. The removal of the thin belt leaves a gap between the two surfaces which is approximately equal to the thickness of the brazing material to be applied thereto so that only minimal external finishing needs to be done after the parts are joined together.

Other methods of joining the parts may, of course, be used, for example, diffusion bonding.

Another use for the linishing process described above is to produce thin trailing edges in the blades. The castings of the two parts 10 and 11 are made thicker than required to leave a machining allowance on them which is removed during the linishing process. This makes the casting process much easier. The blades are cast in the two halves with the trailing edges as thin as is reasonably practical and with the outer surfaces finish cast to size. By locating the two blade halves on their outer surfaces during the linishing process the two joint surfaces are machined relative to each other. This process provides the required thin trailing edge without affecting the shape or accuracy of the outside form of the blade.

Fine holes extending from the rear main cooling passage 15 to the trailing edge of the blade may be formed by cutting matching shallow grooves 20 in one or both of the surfaces of the two parts 10 and 11 before the two parts are joined together.

In an extension of the process it is possible to obtain even more complex internal passage arrangements by producing the article in more than two parts which are then machined in accordance with the invention by using one joint face as a former for another.

I claim:

1. A method of manufacture for a turbine blade having one or more internal passages therein comprising the steps of:

(a) making parts of the blade which when joined together complete the article, at least one of the parts having one or more of the passages at least partially defined in a surface thereof which is adapted to confront a matching surface of another of the parts, (b) electro-lytically machining at least one of the two surfaces which are required to match by passing a linishing belt containing electrolyte between the two surfaces and in contact with both surfaces simultaneously, whereby one acts as a former for machining the other, and passing an electric current from one part to the other and through the electrolyte, and (c) assembling the parts with the matching surfaces in confrontation and with the partially formed passages aligned and joining the surfaces together, thereby creating a hollow turbine blade.

2. A method according to claim 1 and in which the current supplied as a uni-directional d.c. current.

3. A method according to claim 1 and in which the current is a d.c. current the direction of which is periodically reversed.

4. A method according to claim 1 and in which the current is an a.c. current.

5. A method according to claim 1 and in which the turbine blade is made in more than two parts and the matching surfaces to be joined are machined with the linishing belt using one surface as a former for machining another.

6. A method according to claim 1 wherein each of the two surfaces is electro-lytically machined by the linishing belt prior to assembly, and wherein each acts as a former for machining the other.

* * * * *